July 3, 1951 V. STANZEL 2,559,326
CONTROLLING MEANS FOR SELF-PROPELLED MINIATURE AIRCRAFT
Filed Jan. 9, 1945 3 Sheets-Sheet 1

Inventor
Victor Stanzel
By
E. V. Hardway
Attorney

July 3, 1951 V. STANZEL 2,559,326
CONTROLLING MEANS FOR SELF-PROPELLED MINIATURE AIRCRAFT
Filed Jan. 9, 1945 3 Sheets-Sheet 2
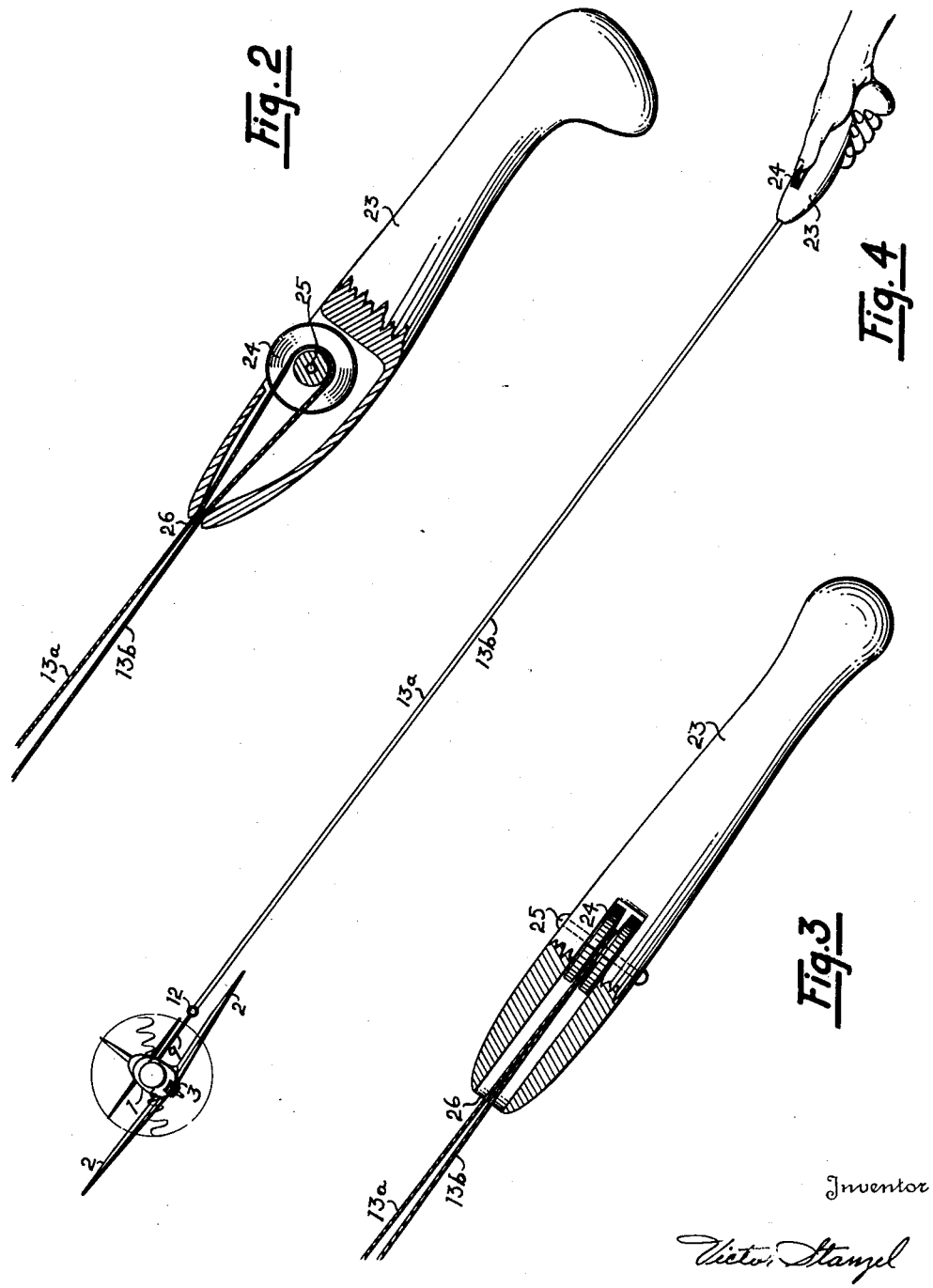
Inventor
Victor Stanzel
By
E. V. Hardway
Attorney July 3, 1951 V. STANZEL 2,559,326
CONTROLLING MEANS FOR SELF-PROPELLED MINIATURE AIRCRAFT
Filed Jan. 9, 1945 3 Sheets-Sheet 3
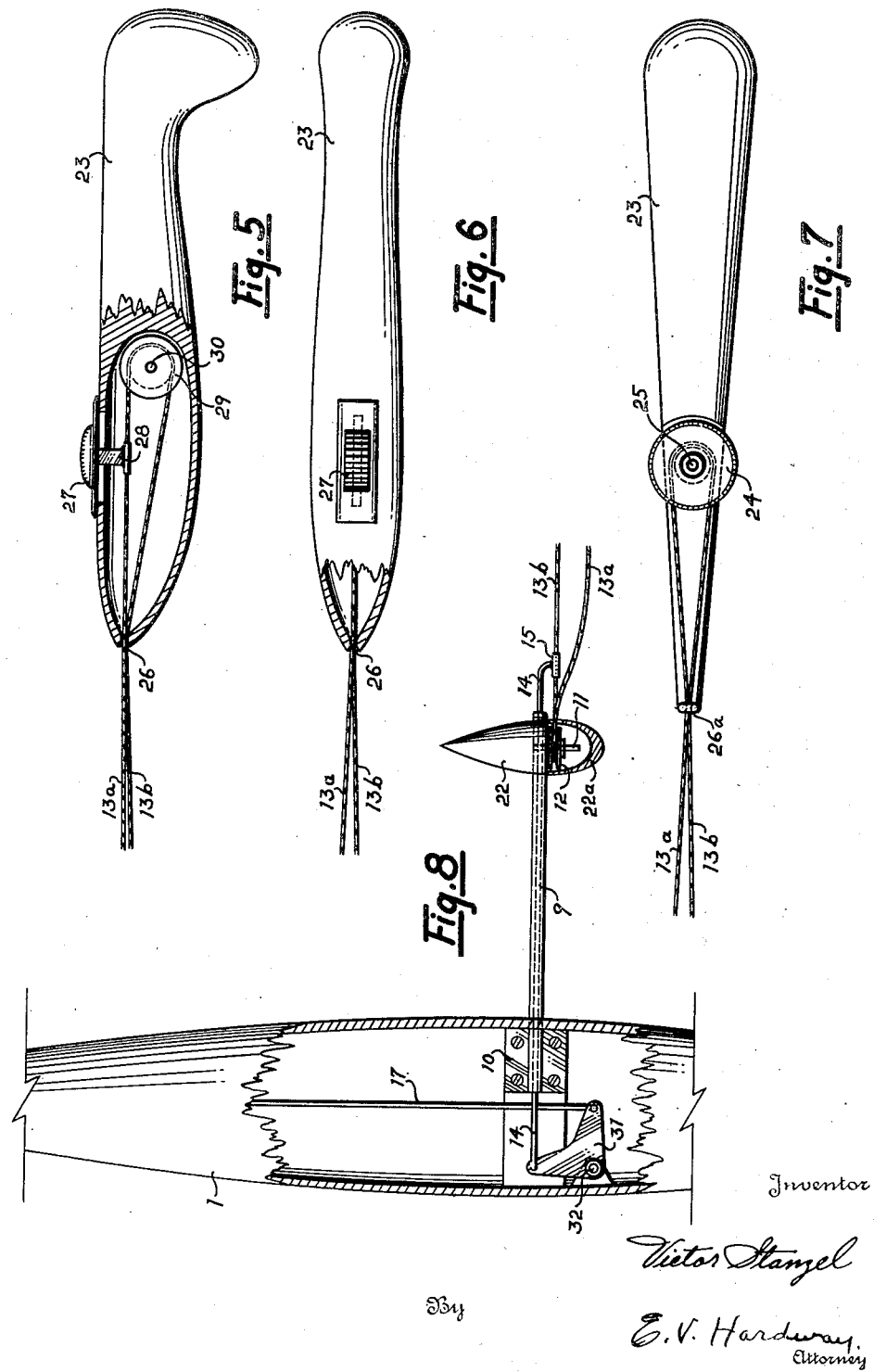

Patented July 3, 1951

2,559,326

UNITED STATES PATENT OFFICE 2,559,326

CONTROLLING MEANS FOR SELF-PROPELLED MINIATURE AIRCRAFT

Victor Stanzel, Schulenburg, Tex.

Application January 9, 1945, Serial No. 572,023

9 Claims. (Cl. 46—77)

This invention relates to controlling means for self-propelled miniature aircraft.

An object of the invention is to provide, in miniature aircraft, of the self-propelled, control line type, an elevator control for controlling the aircraft about its transverse axis and which is not affected by, or sensitive to, the natural yawing action of the craft in flight.

Another object of the invention is to provide an elevator control device which is also effective in giving the craft lateral stability, due to the fact that the control line is operatively connected to the elevator controlling means at a point laterally of the longitudinal axis of the aircraft.

A further object of the invention is to provide a novel grip member, or handle, for the control line, with means thereon arranged to be actuated by the hand of the operator gripping the handle to effectively and precisely actuate the elevator controlling means, through the control line; the connection of the control line to the handle being such that the elevator controlling means will not be sensitive to, or affected by, the movement of the operator's hand, or the handle, as a whole.

Other objects, and novel features of the invention will be disclosed in connection with the detailed description thereof as illustrated in the accompanying drawings, wherein:

Figure 2 shows a side view of the line-controlling handle, partly in section and embodying a rotatable line actuating element.

Figure 3 shows a plan view of the handle, partly in section and embodying a rotatable line actuator.

Figure 4 shows an elevational view of a self-propelled, miniature aircraft, in full flight, and embodying the elevator control connected to a control line equipped with the line controlling handle.

Figure 5 shows a side view, partly in section, of the line controlling handle embodying a sliding line actuating element.

Figure 6 shows a plan view, partly in section, of the line controlling handle embodying a sliding line actuator.

Figure 7 shows a side view of the line controlling handle having the rotatable line actuating element mounted outside, and Figure 8 shows a plan view, partly broken away, of a portion of a miniature aircraft embodying another version of the invention.

Figure 1:
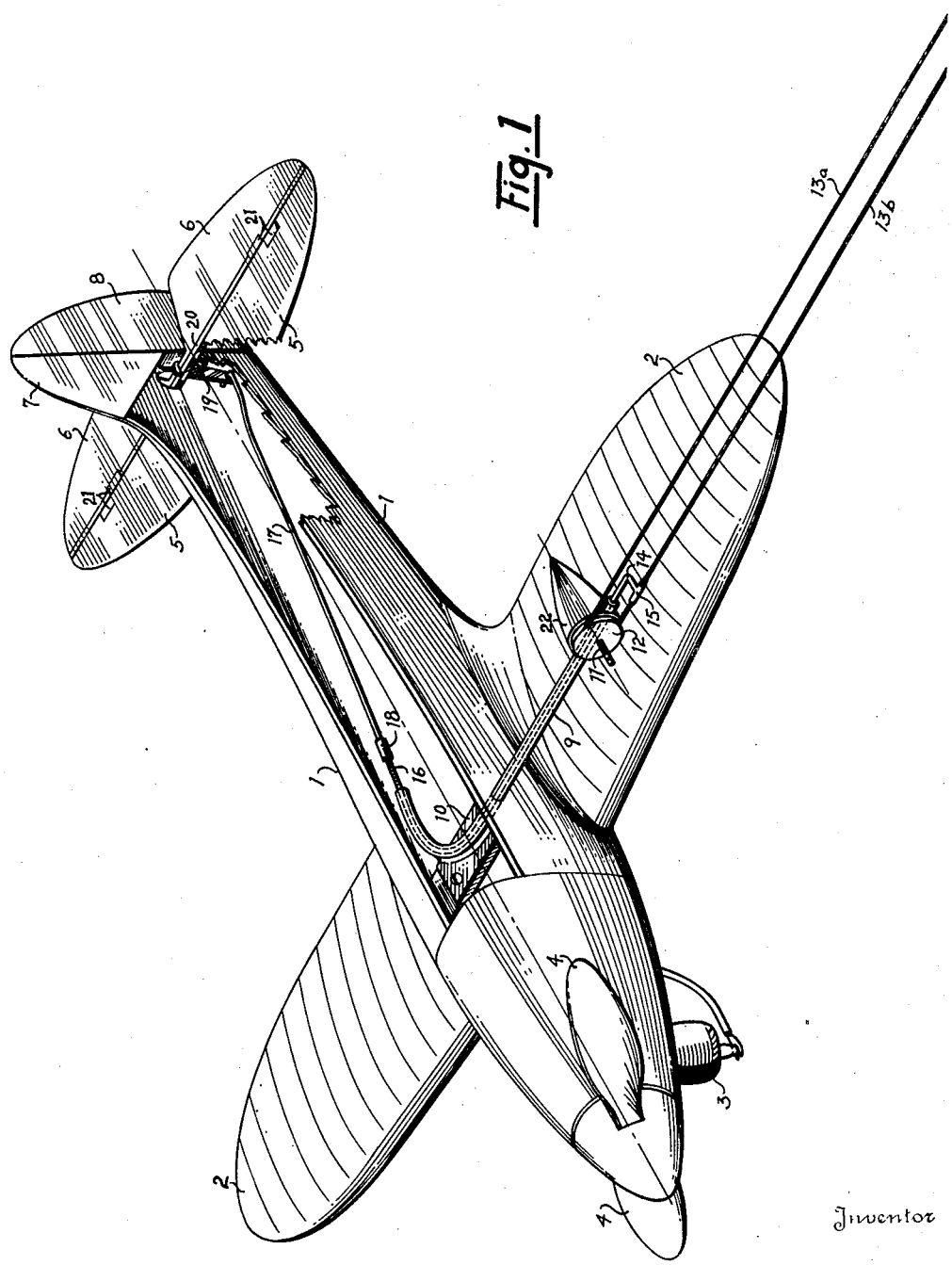
Figure 1 shows a perspective view of a self-propelled, miniature aircraft, partly broken away and embodying the invention.

Referring now more particularly to the drawings, wherein like numerals of reference designate the same parts in each of the figures, the numeral 1 designates the fuselage of the craft which has lateral wings 2, 2 fastened thereto and which is equipped with a suitable motor 3, preferably of the internal combustion type and fastened to the shaft of which there is a conventional propeller 4.

The aircraft is also equipped with the stabilizers 5, 5 and the elevators 6, 6.

The numeral 7 designates the vertical fin and the numeral 8 designates the rudder. These parts are conventional.

There is a tubular housing 9 whose outer end extends laterally through the fuselage 1 preferably above and adjacent one of the wings 2. This housing is suitably fixed on a mounting plate 10 which is fastened to the fuselage so as to hold the housing firmly in place.

Attached to, and extending forwardly from, the outer end of the housing 9 there is a spindle 11. This spindle is therefore located at a point laterally of the longitudinal axis of the aircraft. Mounted to freely rotate on the spindle 11 there is a pulley 12 which is suitably grooved and over which the control line operates. This control line is preferably continuous, or endless, and its upper and lower runs are designated by the numerals 13a and 13b, respectively.

There is a rigid push-pull rod 14 slidably mounted in the housing 9 and its outer end is fastened to the run 13b of the control line, by means of a clinch fitting 15.

The push-pull rod 14 is operatively connected to the rigid rod 17, either by means of a flexible rod 16 working in a rearwardly turned elbow formed on the inner end of the housing 9, as illustrated in Figure 1, or by means of a bell crank 31 movably mounted on the pivot 32, as illustrated in Figure 8.

In the construction embodying the elbow and flexible rod 16, the rigid push-pull rod 14 is attached to the said flexible rod in any suitable manner. The rear end of the rod 16 is connected to the forward end of the rigid rod 17 by means of coupling 18.

The rear end of the rod 17 is pivotally connected to the elevator control horn 19 which is fixed to and depends from the elevator spar 20. The elevators 6, 6 are hinged to the stabilizers 5, 5 by means of the hinges 21, 21.

A streamlined shell 22 may be attached to the housing 9 immediately behind the pulley 12 so as to induce the free flow of the air current behind said pulley. If desired the pulley 12 may be completely enclosed within a streamlined shell by extending the shell 22 forwardly over said pulley as designated by the numeral 22a. An opening is provided on the outer side of the shell 22a to allow the passage of the runs 13a and 13b of the control line. The shell 22a, encompassing the pulley 12, also serves to retain the control line in the groove of the pulley 12 when said control line is slack.

The numeral 23 designates a handle, or grip member, adapted to be gripped and held by the hand of the operator in a manner illustrated in Figure 4. This handle is provided with a line actuating element, either in the form of a rotatable member or a slidable member adapted to be operated by the hand gripping the handle.

In the construction embodying the rotatable element, as illustrated in Figures 2 and 3, there is a roller 24 which is provided with an annular V-groove adapted to grip the control line and which has a knurled outer margin to facilitate the rotation thereof by the hand of the operator. The runs 13a and 13b of the control line operate in the V-groove of the roller 24. This roller is rotatably mounted on a transverse spindle 25 within the forward end of the handle 23, the margin of said roller projecting out slightly beyond the handle so as to be accessible.

In the construction embodying the sliding line actuator, as illustrated in Figures 5 and 6, there is a slider 27, provided with a knurled knob to facilitate movement thereof by the hand of the operator, slidably mounted on the upper side of the handle 23. A line gripping fitting 28, rigidly attached to and depending from the slider 27 through a slot in the handle, is attached to the run 13a of the control line. The runs 13a and 13b of the control line operate over a pulley 29, suitably grooved and mounted to rotate freely on a transverse spindle 30 within the handle 23.

The cavity in the handle, within which the roller 24 or the pulley 29 is mounted, converges forwardly into a restricted opening 26 through the front end of the handle, thus forming a guide to converge the runs 13a and 13b of the control line to substantially a common point.

In the construction illustrated by Figure 7 the roller 24 is mounted on the outside of the handle 23, to rotate on the spindle 25, and an eye 26a is mounted at the forward end of said handle. The runs 13a and 13b of the control line operating over the roller 24, pass through the eye 26a which serves as a means for converging said runs.

In flight, as shown in Figure 4, the path of travel of the aircraft forwardly will be determined by the control line and the aircraft will be laterally stabilized by reason of the fact that the control line is operatively connected to the aircraft at a point laterally of the longitudinal axis of the craft. However, the elevation of the craft will be under the control of the operator. By rotating the roller 24, with his thumb, as indicated in Figure 4, or by sliding the slider 27 back and forth, the operator may move the runs 13a and 13b of the control line thus pushing and pulling the rod 14 correspondingly and this will control the position of the elevators and the elevation of the craft in an obvious manner.

Experiments have shown that the elevator mechanism in the aircraft could be effectively operated by the line controlling handle without using the means for converging the runs 13a and 13b of the control line at the forward end of the handle. However, it was found that because of the vertical span of the runs of the control line on the roller 24 or the pulley 29, any up and down wrist or elbow movement of the hand, which revolved the handle as a whole about an approximately horizontal axis parallel to the axis of the roller 24 or the pulley 29, caused a back and forth movement of the runs of the control line and corresponding movement of the elevators. By converging the runs 13a and 13b of the control line to substantially a common point at the forward end of the handle, this undesirable action was overcome and movement of the elevators occurred only with the rotation of the roller 24 or movement of the slider 27.

The drawings and description are illustrative merely while the broad principle of the invention will be defined by the appended claims.

What I claim is:

1. A handle for the control line of a miniature aircraft comprising, a grip member, an actuating element adapted to grip the control line and to move the runs of said control line back and forth, said element being mounted on the grip member and adapted for operation by a digit of the hand gripping said handle.

2. A handle for the control line of a miniature aircraft comprising, a grip member, an actuating element adapted to operate the control line, said actuator being so mounted on the grip member as to be adapted for operation by a digit of the hand gripping the handle and means for converging runs of the control line at the forward end of the handle.

3. A handle for the control line of a miniature aircraft comprising, a grip member having an opening at the forward end thereof for the passage of a control line therethrough, a line supporting element on the handle positioned to allow the line through the opening to be mounted to operate around said element and means for operating the control line, said means being adapted to be actuated by a digit of the hand gripping the handle.

4. A handle for the control line of a miniature aircraft comprising, a grip member having a line guide at the forward end thereof for the passage of a control line therethrough, a rotatable element on the handle positioned to allow the line through the guide to be mounted on said element for operation thereby, said element being so mounted on the grip member as to be accessible for operation by the hand gripping said handle.

5. A handle for the control line of a miniature aircraft comprising, a grip member, a roller mounted on the handle around which the control line may operate, means accessible for actuation by the hand of the operator gripping said handle and effective to move the line, a line guide at the forward end of the handle through which the runs of the control line, operating over the roller, pass, whereby the runs of the line will be caused to converge to approximately a common point at said guide.

6. A handle for the control line of a miniature aircraft comprising, a grip member, a rotatable line actuator over which the line is adapted to operate, said actuator being accessible for rotation by the hand gripping the handle, the forward end of the handle having an opening for the passage of the runs of the line therethrough said opening being of such dimensions as to cause said runs to converge to a substantially common point at the forward end of the handle.

7. A handle for the control line of a miniature aircraft comprising, a grip member having an internal cavity at its forward end, a roller mounted in said cavity and whose margin projects out beyond the handle to be accessible for rotation by the hand of the operator gripping said handle, said cavity converging forwardly to an opening in the forward end of the handle through which the runs of a control line, operating over the roller, pass, said opening being of such dimensions as to cause the runs of the line to converge to approximately a common point in said opening.

8. A handle for the control line of a miniature aircraft comprising, a grip member, a rotatable element adapted to grip and actuate the runs of a control line, said rotatable element being mounted on the grip member and adapted to be operated by the thumb of the hand gripping the handle.

9. A handle for the control line of a miniature aircraft comprising, a grip member, a line supporting element on the handle, line actuating means including a slidable element adapted to be operated by the thumb of the hand gripping the handle.

VICTOR STANZEL.

REFERENCES CITED

The following references are of record in the file of this patent:

UNITED STATES PATENTS

| Number | Name | Date |
|---|---|---|
| 285,630 | Kasschan | Sept. 25, 1883 |
| 369,622 | Titus | Sept. 6, 1887 |
| 412,629 | Kepler | Oct. 8, 1889 |
| 1,744,529 | DeHaven | Jan. 21, 1930 |
| 2,292,416 | Walker | Aug. 11, 1942 |

FOREIGN PATENTS

| Number | Country | Date |
|---|---|---|
| 361,585 | Germany | Oct. 16, 1922 |